US010212038B2

(12) United States Patent
Albrecht et al.

(10) Patent No.: US 10,212,038 B2
(45) Date of Patent: Feb. 19, 2019

(54) WEB SERVER COMPONENT AND METHOD FOR PROVIDING ACCESS TO DEVICE CONFIGURATION DATA WITHIN AN INDUSTRIAL AUTOMATION SYSTEM

(71) Applicant: Siemens Aktiengesellschaft, Munich (DE)

(72) Inventors: Harald Albrecht, Nuremberg (DE); Harald Herberth, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 197 days.

(21) Appl. No.: 15/250,229

(22) Filed: Aug. 29, 2016

(65) Prior Publication Data
US 2017/0063624 A1  Mar. 2, 2017

(30) Foreign Application Priority Data
Aug. 31, 2015 (EP) .................... 15183171

(51) Int. Cl.
*G06F 15/177* (2006.01)
*H04L 12/24* (2006.01)
(Continued)

(52) U.S. Cl.
CPC ...... *H04L 41/0866* (2013.01); *H04L 61/2007* (2013.01); *H04L 61/6059* (2013.01);
(Continued)

(58) Field of Classification Search
CPC ............ H04L 41/0866; H04L 61/2007; H04L 61/6059; H04L 61/6086; H04L 61/1511;
(Continued)

(56) References Cited

U.S. PATENT DOCUMENTS

| 7,333,510 | B1 | 2/2008 | Hies et al. |
| 2003/0225911 | A1 | 12/2003 | Lee et al. |
| 2010/0228813 | A1* | 9/2010 | Suzuki .............. H04L 29/12066 709/203 |
| 2014/0188933 | A1 | 7/2014 | Chomik et al. |
| 2017/0171315 | A1* | 6/2017 | McNab .................. H04L 67/12 |

FOREIGN PATENT DOCUMENTS

| DE | 10 2011 078 030 A1 | 12/2012 |
| EP | 1 770 458 A2 | 4/2007 |

OTHER PUBLICATIONS

Dujuan Gu et al, "A transparent solution for legacy applications between heterogeneous networks"; 2013 IEEE Global Communications Conference; IEEE; pp. 2176-2181; XP032604566; DOI: 10.1109/GLOCOM.2013.6831397; 2013.
(Continued)

*Primary Examiner* — Wing F Chan
*Assistant Examiner* — Joseph R Maniwang
(74) *Attorney, Agent, or Firm* — Cozen O'Connor

(57) ABSTRACT

A method in which a check is performed to determine whether a request originates from a requesting communication device from an IPv6 subnetwork or comprises a destination resource identifier allocated to a Web server component with an IPv6 address or a device name to provide access to device configuration data of an IPv4-based automation device within an industrial automation system in cases of a request for a Web document with device configuration data, wherein if the check result is positive, the Web document is provided with a reference to the device configuration data which includes an Ipv6 address printout or a device name, where in the case of a request for the Web document which originates from a requesting communication device from an IPv4 subnetwork and/or comprises a destination resource identifier with an IPv4 address, the reference to the device configuration data comprises an IPv4 address printout.

14 Claims, 2 Drawing Sheets

(51) Int. Cl.
*H04L 29/08* (2006.01)
*H04L 29/06* (2006.01)
*H04L 29/12* (2006.01)
*G05B 19/418* (2006.01)

(52) U.S. Cl.
CPC .......... *H04L 61/6086* (2013.01); *H04L 67/02* (2013.01); *H04L 67/12* (2013.01); *H04L 69/167* (2013.01); *G05B 19/4185* (2013.01); *G05B 2219/25217* (2013.01); *H04L 61/1511* (2013.01)

(58) Field of Classification Search
CPC ....... H04L 67/02; H04L 67/12; H04L 69/167; G05B 19/4185; G05B 2219/25217
USPC ......................................................... 709/220
See application file for complete search history.

(56) References Cited

OTHER PUBLICATIONS

Li, X. et al., "IP/ICMP Translation Algorithm", Internet Engineering Task Force (IETF), Request for Comments: 6145, Apr. 2011.
Bagnulo, M. et al., "Stateful NAT64: Network Address and Protocol Translation from IPv6 Clients to IPv4 Servers", Internet Engineering Task Force (IETF), Request for Comments: 6146, Apr. 2011.
Bagnulo, M. et al., "DNS64: DNS Extensions for Network Address Translation from IPv6 Clients to IPv4 Servers", Internet Engineering Task Force (IETF), Request for Comments: 6147, Apr. 2011.
Fielding, R. et al., "Hypertext Transfer Protocol (HTTP/1.1: Message Syntax and Routing", Internet Engineering Task Force (IETF), Request for Comments: 7230, Jun. 2014.

* cited by examiner

WEB SERVER COMPONENT AND METHOD FOR PROVIDING ACCESS TO DEVICE CONFIGURATION DATA WITHIN AN INDUSTRIAL AUTOMATION SYSTEM

BACKGROUND OF THE INVENTION

1. Field of the Invention

The present invention relates to industrial automation systems and, more particularly, to a web server component and method for providing access to device configuration data within an industrial automation system.

2. Description of the Related Art

Industrial automation systems are used to monitor, control and regulate technical processes, particularly in the field of production, process and building automation, and to enable an operation of control units, sensors, machinery and industrial plants that is intended to be performed as autonomously and as independently from human intervention as possible. Due to a constantly increasing importance of information technology for automation systems comprising numerous networked control and computer units, methods for the reliable provision of functions distributed over an automation system are becoming increasingly important for a provision of monitoring, control and regulating functions.

Interruptions of communication connections between computer units of an industrial automation system or automation devices can result in an unwanted or unnecessary repetition of the transfer of a service request. This causes an additional utilization of communication connections of the industrial automation system, which may result in further system failures or faults. Furthermore, messages that have not been transmitted or have not been completely transmitted may, for example, prevent an industrial automation system from switching to or remaining in a safe operating condition. This may ultimately result in an outage of a complete production plant and a costly production stoppage. Within industrial automation systems, one particular problem is regularly caused by message traffic with comparatively numerous but relatively short messages, as a result of which the above problems are exacerbated.

EP 1 770 458 A2 describes an industrial automation system with at least one programmable logic controller module in which a configuration unit is provided for configuring the control unit and for announcing its availability on a communication network. The configuration unit allocates a unique communication network address which may, for example, be an IPv6 address to the control unit. In this way, the control unit can be automatically placed into service.

U.S. Pat. No. 7,333,510 B1 discloses a data transfer method in which a name service component records IPv4 addresses and allocated device names within a subnetwork for a group of communication devices. An IPv6 address is calculated in each case for the group of communication devices from an Ipv6 prefix allocated to the subnetwork and the Ipv4 addresses of the communication devices. Furthermore, address conversion rules are determined for the group of communication devices from the Ipv4 addresses of the communication devices and the calculated IPv6 addresses. The determined address conversion rules are applied by an address conversion unit for an address conversion between IPv4 addresses and IPv6 addresses.

A conversion of Transmission Control Protocol (TCP) and User Datagram Protocol (UDP) communication connections that are based on Internet Protocol, Version 6 (IPv6), to communication connections based on Internet Protocol, Version 4 (IPv4), is described in Internet Engineering Task Force (IETF), Request for Comments (RFC) 6145 and 6146, ISSN 2070-1721, April 2011. A conversion of this type is referred to as Network Address Translation (NAT64). IPv6-based communication devices can access IPv4-based communication devices via NAT through the performance of an address format adaptation. In NAT64, in order to access IPv4 communication devices, IPv6 communication devices use virtual IPv6 addresses that are replaced by a NAT64 server with Ipv4 addresses allocated to the IPv4 communication devices. Similarly, communication network addresses for back channels are converted from IPv4 communication devices to IPv6 communication devices. In principle, an allocated forward channel must first be configured for a back channel.

It is additionally known from IETF, RFC 6147 to calculate allocated IPv6 address entries (AAAA Resource Records) in a Domain Name System (DNS) from IPv4 address entries, which are referred to as A Resource Records (RR), and to make these IPv6 address entries available via DNS servers. In principle, a derivation of AAAA Resource Records from A Records can be achieved manually by a DNS administrator, can be planned via an IP Address Management (IPAM) solution or can be determined continuously and automatically via DNS64 servers. An automatic determination via DNS64 servers is appropriate whenever an AAAA Resource Record is requested for a name for which only A Resource Records exist.

Many automation devices now comprise integrated Web servers. Users can display diagnostic or device configuration information in a simple manner via integrated web servers of this type. This also includes diagnostic device configuration information of subordinate automation devices or field devices that can be retrieved via links in overview pages of a superordinate automation device. If the subordinate automation devices or field devices in particular have IPv4 addresses only, a correct resolution of the links in the overview pages is problematic in the case of access from an IPv6 subnetwork. Problems of this type cannot be solved through the use of interposed NAT64 routers alone if address details are embedded in data at application protocol level (Layer 7 according to the OSI communication model). Address details of this type cannot be recorded by NAT64 routers, because these routers operate at network or transport protocol level (Layers 3 and 4 according to the OSI communication model).

SUMMARY OF THE INVENTION

It is an object of the present invention to provide an apparatus and method for reliable Web-server-based provision of access to device configuration data of automation devices with IPv4 addresses from IPv6 subnetworks.

This and other objects and advantages are achieved in accordance with the invention by a Web server component and method for providing access to diagnostic and device configuration data within an industrial automation system, in which the Web server component, which that is allocated to a subnetwork control unit, provides at least one Web document with at least one reference, such as a hyperlink, to device configuration data of at least one IPv4-based automation device. The industrial automation system comprises a subnetwork with a plurality of automation devices and the subnetwork control unit. If the Web document is requested, a check is performed to determine whether the request originates from a requesting communication device from an IPv6 subnetwork or comprises a destination resource identifier allocated to the Web server component, such as a Uniform Resource Identifier, with an IPv6 address or with a device name. If the check result is positive, the Web document is provided with a reference to the device configuration data that comprises an Ipv6 address printout or a device name, such as a Domain Name System name, of the respective automation device. Conversely, in the case of a request for the Web document that originates from a requesting communication device from an IPv4 subnetwork or comprises a destination resource identifier with an IPv4 address, the reference to the device configuration data comprises an IPv4 address printout.

In accordance with the invention, an IPv6 address is calculated for an automation device with an IPv4 address from an IPv6 prefix allocated to the subnetwork and the IPv4 address of the automation device if the Web document is to be provided with a reference to the device configuration data that comprises an IPv6 address printout or a device name of the respective automation device. The calculated IPv6 address and the allocated device name are stored in a name service server.

The references to the device configuration data are generated adaptively with IPv6 address printouts or device names or with IPv4 address printouts depending on requests at the receiving end. As a result, existing IPv4-based automation devices can be integrated reliably into a superordinate IPv6 communication network without additional configuration outlay. In particular, restrictions existing in a Web-server-based provision of diagnostic or device configuration data of IPv4-based automation devices despite NAT64 are lifted.

Device configuration data of the automation devices are advantageously provided by Web servers of the automation devices, so that the Web server component of the subnetwork control unit is relieved of this burden. Furthermore, the subnetwork may comprise a plurality of automation devices to which at least one IPv6 address is allocated in each case. Here, references to device configuration data are modified only for automation devices to which only IPv4 addresses are allocated. Device configuration data of automation devices can thus be reliably provided in hybrid IPv4/IPv6 environments also.

The destination resource identifier may be indicated, for example, in a host header field of the request. If the host header field is absent, the reference to the device configuration data preferably comprises an IPv4 address printout. Conversely, if the host header field and a destination resource identifier comprising an IPv6 address or a device name of the respective automation device are present, the reference to the device configuration data preferably comprises an IPv6 address printout. The host header field may be formed, for example, according to RFC 7230.

In accordance with one preferred embodiment of the present invention, the reference to the device configuration data is generated or modified by an adaptation module that is allocated to the Web server component or is embedded in the provided Web document. In particular, the adaptation module can be implemented by a script embedded in a provided Web page that selects a respectively required format of hyperlinks that refer to Web pages with device configuration data depending on a host header field in an underlying Hypertext Transfer Protocol (HTTP) request. For example, the format can be selected according to the Document Object Model (DOM) by a "document.location" property, the content of which corresponds to the host header field. In principle, the adaptation module can generate or modify references to device configuration data in Web documents comprising address printouts at the request of at least one other module or application module of the Web server component or autonomously. In an advantageous embodiments, the adaptation module checks the Web document request with respect to its origin or with respect to the destination resource identifier.

A peripheral device recording unit allocated to the subnetwork control unit advantageously records device name address allocations of automation devices subordinate to the subnetwork control unit. The device name address allocations can be recorded simply and reliably by the peripheral device recording unit, for example, via the Dynamic Configuration Protocol (DCP) or Simple Network Management Protocol (SNMP).

In accordance with an advantageous embodiment of the present invention, address conversion rules are determined for the automation devices with an IPv4 address from respective IPv4 addresses and calculated IPv6 addresses, where the rules are applied by an address conversion unit, such as a NAT64 router, allocated to the subnetwork control unit for an address conversion between IPv4 addresses and IPv6 addresses. In particular, the Web server component allocated to the subnetwork control unit can be integrated into a NAT64 router so that the Web server component is addressable via an IPv6 address of the NAT64 router and references to device configuration data can be provided on the basis thereof with IPv6 address printouts or device names. However, it is also possible in principle for the Web server component to be addressable within its subnetwork only via an IPv4 address and to be provided with IPv6 connectivity only via an upstream-connected NAT64 router. In this case, Web document requests originating from an IPv6 subnetwork in fact comprise a destination resource indicator allocated to the Web server component with a (virtual) IPv6 address or with a device name, so that references to device configuration data can be correctly generated or modified.

The Web server component in accordance with the invention is provided to implement a method as described above and is configured to provide a Web document with at least one reference to device configuration data of at least one automation device with an IPv4 address. Furthermore, the Web server component is configured to check, in the case of a request for the Web document, whether the request originates from a requesting communication device from an IPv6 subnetwork or comprises a destination resource identifier allocated to the Web server component with an IPv6 address or with a device name. Furthermore, the Web server component is configured to provide the Web document, if the check result is positive, with a reference to the device configuration data that comprises an IPv6 address printout or a device name of the respective automation device. In addition, the Web server component is configured so that, in the case of a request for the Web document that originates from a requesting communication device from an IPv4 subnetwork or which comprises a destination resource identifier with an IPv4 address, the reference to the device configuration data comprises an IPv4 address printout. Furthermore, the Web server component is configured so that an IPv6 address is calculated for an automation device with an IPv4 address from an IPv6 prefix allocated to the subnetwork and the IPv4 address of the automation device, if the Web document is to be provided with a reference to the device configuration data that comprises an IPv6 address printout or a device name of the respective automation device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in detail below on the basis of an example embodiment with reference to the drawings in which.

DETAILED DESCRIPTION OF THE EXEMPLARY EMBODIMENTS

Figure 1:
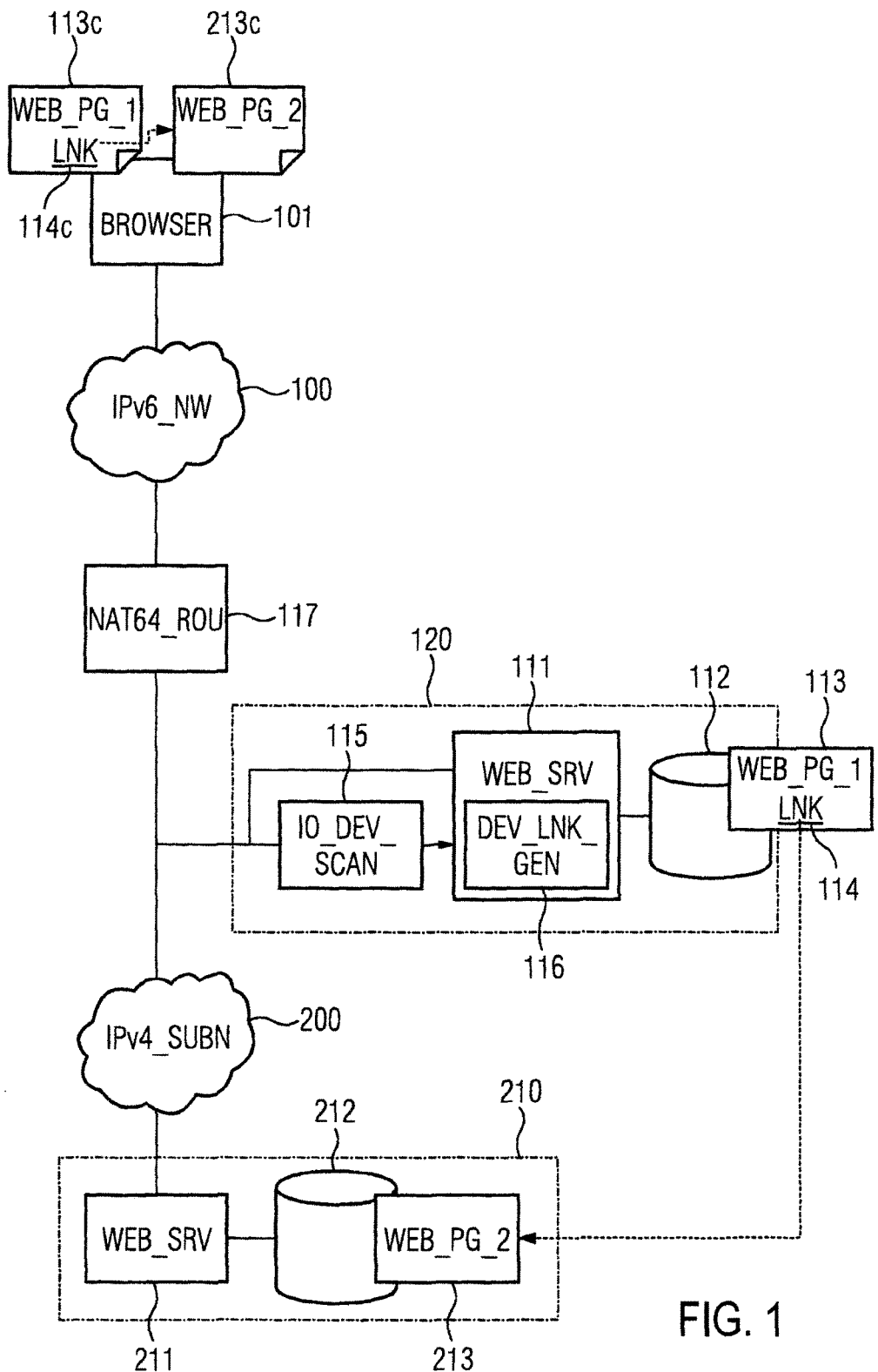
FIG. 1 shows an industrial automation system that comprises a subnetwork control unit with a Web server component and an IPv4-based automation device.

Industrial automation devices, such as programmable logic controllers, decentralized peripheral modules or input/output modules connected to devices to be controlled normally comprise integrated Web servers. Users can display various types of diagnostic information in a simple manner via integrated Web servers of this type. In accordance with the present exemplary embodiment, users can retrieve an overview Web page with field devices 210 currently connected to a controller 120. Overview Web pages 113 of this type comprise hyperlinks 114 to Web pages which are allocated to subordinate field devices 210. With reference to FIG. 1, the illustrated field device 210 has its own Web server 211 with an allocated storage unit 212 for provided Web pages. This is typical, for example, of robot controllers. In the present exemplary embodiment, the field device 210 is purely IPv4-based and has no communication module that implements an IPv6 stack. Hyperlinks 114 to the field device 210 thus comprise IPv4 address literals, such as "http://192.168.3.217".

In an IPv6 environment, IPv4 address literals cause problems according to previous solutions, particularly if no end-to-end IPv6 addressing for all automation devices is implemented within an automation network and the automation devices are essentially addressable outside their automation network via IPv6 addresses based on Network Address Translation (NAT). With NAT64, an interposed NAT64 router 117 ensures an address and protocol conversion between IPv6 and IPv4. However, NAT64 does not record any communication network addresses embedded in datagrams at higher protocol levels. This concerns, in particular, HTTP documents that are handled at application level (Layer 7) according to the OSI communication model, whereas NAT64 routers cover only the network and transport levels (Layers 3 and 4).

For this reason, in accordance with the present exemplary embodiment, hyperlinks 114 in Web pages 113, 113c provided by a Web server 111 of the controller 120 are each adapted in a receiver-specific manner according to its connectivity. However, no Dispatcher Web Server, which distributes Web page requests to subordinate Web servers, is provided for this purpose, but rather the Web pages are adapted either at the transmitting end prior to delivery or even at the receiving end only. The adaptation is implemented based on host header fields in HTTP Web page requests. The Web pages 113, 113c are stored in at least one storage unit 112 allocated to the Web server 111.

For example, the Web server 111 of the controller 120 may comprise a module 116 that either independently adapts hyperlinks in Web pages 113 to be provided before their transfer to respective receivers by searching for IPv4 literals before a provisioning and replacing them depending on receiver connectivity. In accordance with an alternative embodiment, the module 116 can be called by other modules or application modules of the Web server 111 as soon as they generate a hyperlink to an automation device in a Web page. In a further alternative embodiment, the module 116 is embedded in the provided Web page 113c. Here, a script embedded in the provided Web page 113c selects a respectively required form of the hyperlinks 114c. The form is advantageously correctly selected according to the Document Object Model (POM) via a specification of a "document.location" property consistent with the host header field. The module 116 is actively called whenever hyperlinks to subordinate devices are to be generated in Web pages 113, 113c to be provided.

The present solution ensures that Web pages 113, 113c are provided at the receiving end in the case of a request for diagnostic data for the IPv4-based field device 210, where the pages contain hyperlinks to subordinate field devices with IPv4 address literals if the request originates from an IPv4 network 200 and the Web server 111 is originally addressed directly via an IPv4 address. Conversely, if the request originates from an IPv6 network 100 or if the Web server 111 is operated via its DNS name Domain Name System (DNS) or its IPv6 addresses, Web pages 113, 113c are provided that refer in the hyperlinks to subordinate field devices via DNS names.

The respectively required form of the hyperlinks 114c is preferably selected based on host header fields formed according to IETF, RFC 7230, Section 5.4. If the host header field is absent or comprises a URI (Uniform Resource Identifier) host in the form of an IPv4 address literal, a Web page 113, 113c to be provided is generated with references to subordinate field devices in the form of IPv4 address literals. Conversely, if the host header field is present and the URI host comprises a DNS name or an IPv6 address literal, a Web page 113, 113c to be provided is generated with references to subordinate field devices in the form of DNS names.

The present exemplary embodiment is based on a DNS infrastructure that can be implemented, for example, by a configuration-free location and incorporation of DNS servers into IPv6-based automation networks described in European patent application 15162021.8. In addition, an automatic, stable and adaptive allocation of prefixes in segmented isolated networks described in European patent application 14171757.9 can be provided. A solution of this type is even configuration-free in IPv6 isolated networks.

The Web server 111 may, for example, be combined with the NAT64 router 117 or may be integrated into the latter. DNS names of subordinate field devices are preferably detected within the IPv4 network 200 by a device scanner 115 and are transferred to the Web server 111 for generation of context-dependent hyperlinks. The device scanner 115 can determine IPv4 addresses and device names of the subordinate field devices, for example, via Dynamic Configuration Protocol (DCP) or Simple Network Management Protocol (SNMP). Furthermore, planning information can also be included.

If the Web server 111 and the NAT64 router 117 are designed as devices that are separated from one another, the Web server 111 is addressable in some instances only via IPv4. Due to the interposed NAT64 router 117, the Web server 111 is addressable at least via its virtual IPv6 address via a Web browser 101 allocated to the IPv6 network 100. The Web browser 101 can thus transfer a Web page request with a host header field comprising the DNS name of the Web server 111 to the Web server 111. The Web page 113, 113c can thus be correctly generated with DNS names instead of IPv4 address literals. Consequently, hyperlinks 114c comprising DNS names in the provided Web page 113c are correctly resolved in IPv6 addresses or virtual IPv6 addresses of subordinate field devices. In the case of purely IPv4-based field devices, the NAT64 router then ensures a corresponding IPv6/IPv4 connectivity.

Figure 2:
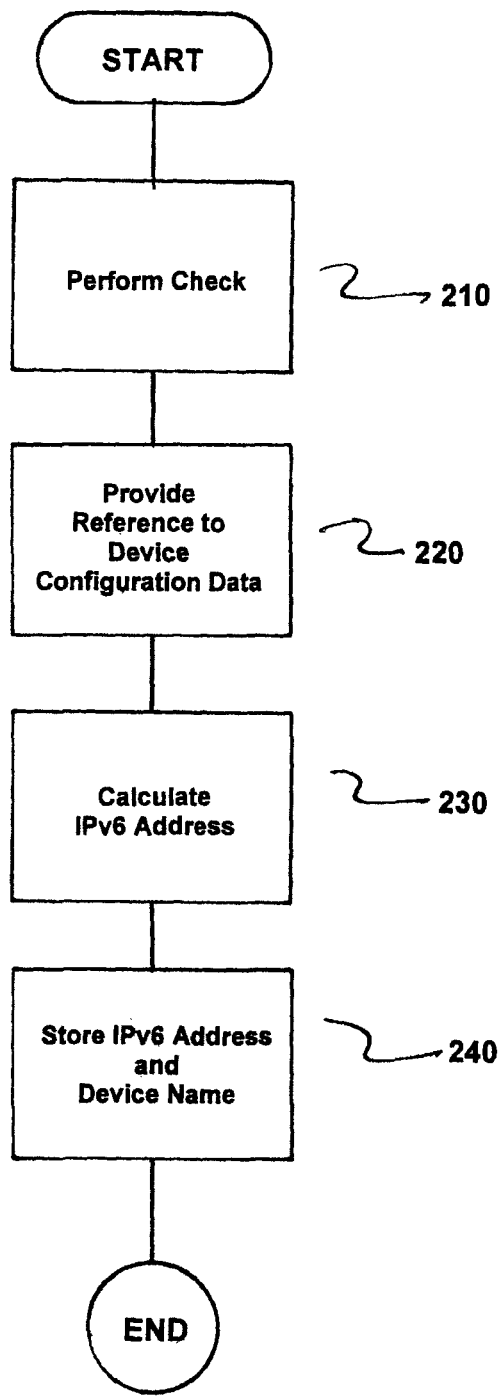
FIG. 2 is a flowchart of the method in accordance with the invention.

FIG. 2 is a flowchart of a method for providing access to device configuration data within an industrial automation system comprising a subnetwork having a plurality of automation devices and a subnetwork controller, where a Web server component allocated to the subnetwork controller provides at least one Web document with at least one reference to device configuration data of at least one IPv4-based automation device. The method comprises performing a check to determine whether at least one request originates from at least one of (i) a requesting communication device from an IPv6 subnetwork and (ii) comprises a destination resource identifier allocated to the Web server component with an IPv6 address or with a device name, if the at least one web document is requested, as indicated in step 210.

Next, the Web document is provided with a reference to the device configuration data which comprises one of (i) an Ipv6 address printout and (ii) a device name of the respective automation device, if the check result is positive, as indicated in step 220. Here, the reference to the device configuration data comprises an IPv4 address printout when a request for the Web document at least one of (i) originates from a requesting communication device from an IPv4 subnetwork and (ii) comprises a destination resource identifier with an IPv4 address.

An IPv6 address for an automation device with an IPv4 address from an IPv6 prefix allocated to the subnetwork and the IPv4 address of the automation device is now calculated if the at least one Web document is to be provided with a reference to the device configuration data which comprises one of (i) the IPv6 address printout and (ii) the device name of the respective automation device, as indicated in step 230.

Next, the calculated IPv6 address and the allocated device name are stored in a name service server, as indicated in step 240.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing access to device configuration data within an industrial automation system comprising a subnetwork having a plurality of automation devices and a subnetwork controller, a Web server component allocated to the subnetwork controller providing at least one Web document with at least one reference to device configuration data of at least one IPv4-based automation device, the method comprising:

performing a check when a request for the at least one web document is received to determine whether the request at least one of (i) originates from a requesting communication device located in an IPv6 subnetwork and (ii) comprises a destination resource identifier allocated to the Web server component with an IPv6 address or with a device name;

providing the Web document with a reference to the device configuration data which comprises one of (i) an Ipv6 address and (ii) a device name of the respective automation device when the request at least one of (i) originates from the requesting communication device located in the IPv6 subnetwork and (ii) comprises the destination resource identifier allocated to the Web server component with the IPv6 address or with the device name;

providing the Web document with the reference to the device configuration data which comprises an IPv4 address when the request for the Web document at least one of (i) originates from a requesting communication device located in an IPv4 subnetwork and (ii) comprises a destination resource identifier with an IPv4 address;

calculating an IPv6 address for an automation device with an IPv4 address from an IPv6 prefix allocated to the subnetwork and the IPv4 address of the automation device if the at least one Web document is to be provided with a reference to the device configuration data which comprises one of (i) the IPv6 address and (ii) the device name of the respective automation device; and storing the calculated IPv6 address and an allocated device name in a name service server.

2. The method as claimed in claim 1, wherein the reference to the device configuration data is generated or modified by an adaptation module which is one of (i) allocated to the Web server component and (ii) embedded in the provided at least one Web document.

3. The method as claimed in claim 2, wherein the adaptation module generates or modifies references to device configuration data in Web documents comprising addresses at a request of at least one application module of the Web server component or autonomously.

4. The method as claimed in claim 2, wherein the adaptation module checks the at least one Web document request with respect to at least one of (i) an origin of the at least one Web document and (ii) the destination resource identifier.

5. The method as claimed in claim 2, wherein the adaptation module checks the at least one Web document request with respect to at least one of (i) an origin of the at least one Web document and (ii) the destination resource identifier.

6. The method as claimed in claim 5, wherein the device name address allocations are recorded via at least one of (i) Dynamic Configuration Protocol and (ii) Simple Network Management Protocol.

7. The method as claimed in claim 6, wherein the Web server component allocated to the subnetwork controller is integrated into the address converter, the address converter comprising a router.

8. The method as claimed in claim 7, wherein the host header field is formed in accordance with Request for Comments (RFC) 7230.

9. The method as claimed in claim 1, wherein a peripheral device recorder allocated to the subnetwork controller records device name address allocations of automation devices subordinate to the subnetwork controller.

10. The method as claimed in claim 1, wherein address conversion rules are determined for the automation devices with an IPv4 address from respective IPv4 addresses and calculated IPv6 addresses; and wherein the determined address conversion rules are applied by an address converter allocated to the subnetwork controller to convert addresses between IPv4 addresses and IPv6 addresses.

11. The method as claimed in claim 1, wherein the destination resource identifier can be indicated in a host header field of the request;

wherein the reference to the device configuration data comprises an IPv4 address, if the host header field is absent; and wherein the reference to the device configuration data comprises an IPv6 address if the host header field and a destination resource identifier, which comprises an IPv6 address or a device name of the respective automation device, are present.

12. The method as claimed in claim 1, wherein the device name of the automation device is a Domain Name System name.

13. The method as claimed in claim 1, wherein device configuration data of the automation devices are provided by Web servers of the automation devices.

14. The method as claimed in claim 1, wherein the subnetwork comprises a plurality of automation devices to which at least one IPv6 address is allocated in each of the plurality of automation devices; and wherein references to device configuration data are modified only for automation devices to which only IPv4 addresses are allocated.

* * * * *